(12) United States Patent
Bullard, IV

(10) Patent No.: US 11,209,025 B2
(45) Date of Patent: Dec. 28, 2021

(54) SIPHON FLOAT SYSTEM

(71) Applicant: Frank Leverett Bullard, IV, Beaufort, SC (US)

(72) Inventor: Frank Leverett Bullard, IV, Beaufort, SC (US)

(73) Assignee: Frank L Bullard, IV, Machen, GA (US)

( * ) Notice: Subject to any disclaimer, the term of this patent is extended or adjusted under 35 U.S.C. 154(b) by 485 days.

(21) Appl. No.: 16/350,535

(22) Filed: Nov. 29, 2018

(65) Prior Publication Data

US 2019/0310664 A1 Oct. 10, 2019

Related U.S. Application Data

(63) Continuation-in-part of application No. 15/600,981, filed on May 22, 2017, now abandoned.

(51) Int. Cl.
*F04F 10/02* (2006.01)
*G05D 9/02* (2006.01)

(52) U.S. Cl.
CPC ............ *F04F 10/02* (2013.01); *G05D 9/02* (2013.01)

(58) Field of Classification Search
CPC .. F04F 10/00; F04F 10/02; G05D 9/02; F03B 13/086; Y10T 137/2795; Y10T 137/2911
See application file for complete search history.

(56) References Cited

U.S. PATENT DOCUMENTS

| | | | | |
|---|---|---|---|---|
| 278,661 A ‡ | 5/1883 | Ferre | .................... | B67D 1/0456 137/152 |
| 778,608 A ‡ | 12/1904 | Rogers | ................ | F04B 39/0011 417/101 |
| 962,624 A | 9/1908 | Cook | | |
| 1,605,207 A | 3/1926 | Bitte | | |
| 3,011,510 A | 9/1959 | Standifird | | |
| 4,117,676 A * | 10/1978 | Atencio | ................ | F03B 13/086 60/327 |
| 4,182,123 A * | 1/1980 | Ueda | ..................... | F03B 13/086 60/325 |
| 4,414,997 A | 11/1983 | Jacobson et al. | | |
| 4,695,376 A * | 9/1987 | Astrom | .............. | B01D 21/2433 210/122 |
| 6,283,137 B1 | 9/2001 | Malecki | | |
| 7,083,716 B2 * | 8/2006 | Smith | ................ | B01D 21/0027 210/122 |
| 8,763,625 B1 * | 7/2014 | Carter | .................... | F04F 10/00 137/149 |
| 2010/0284784 A1 * | 11/2010 | Farb | ........................ | F03B 13/08 415/2.1 |
| 2012/0020734 A1 * | 1/2012 | Ross | ..................... | F03B 13/086 405/75 |

\* cited by examiner
‡ imported from a related application

*Primary Examiner* — Ryan A Reis

(57) ABSTRACT

A siphon float system comprises a siphon pipe with which the intake is supported by its connection to a float with a batch reactor wherein the float maintains a constant siphon intake depth below the fluid surface of the batch reactor. One or more valves prevent reverse flow within the siphon pipe and control flow as desired based upon fluid levels within a batch reactor. One or more siphons connect to an outfall control structure designed to permanently keep the siphon pipe full of fluid and able to actively siphon fluid as desired.

9 Claims, 5 Drawing Sheets

SIPHON FLOAT SYSTEM

VAVLE CONTROLLED SIPHON FLOAT SYSTEM

SIPHON FLOAT SYSTEM

VAVLE CONTROLLED SIPHON FLOAT SYSTEM

PRESSURE CONTROLLED SIPHON FLOAT SYSTEM

SIPHON FLOAT SYSTEM

SIPHON FILTER INTAKE (8)

SIPHON FLOAT SYSTEM

OUTFALL CONTROL BUOY (9)

OUTFALL CONTROL STRUCTURE (6)

SIPHON FLOAT SYSTEM

SIPHON FLOAT INTAKE (25)

VALVE CONTROL SYSTEM (7)

SIPHON FLOAT SYSTEM

CROSS-REFERENCE TO RELATED APPLICATION

Referenced patents that include some relation or part of the Siphon Float System include U.S. Pat. No. 962,624A by Cook 1908 Sep. 24 with which generally relates to siphons, and particularly to one adapted for use in irrigating land;

U.S. Pat. No. 4,414,997A by Jacobson & Valle 1980 Jun. 27 with which a portable siphon device is described with a pressure activated valve at the intake restricting reverse flow;

U.S. Pat. No. 6,283,137B1 by Malecki 1999 Mar. 1 with which a priming assembly including an improved one-way valve allow the rapid flow of large volumes of fluid and method of filling the siphon tube with fluid;

U.S. Pat. No. 278,661A by Ferre 1883 May 29 with which a siphon is described as a method of drawing liquids from casks as close as possible to the lowest part of the cask inside, from which the liquid is drawn, and yet to prevent any dregs which may be in the lowest part of the cask from being drawn up with the liquid;

U.S. Pat. No. 4,695,376A by Astom, Weis and Shubert 1987 Sep. 22 with which a floating decanter is described as a method of removing fluid from a batch reactor based upon fluid levels within a batch reactor;

U.S. Pat. No. 1,605,207A by Bitte 1926 Mar. 9 describing a siphon intake that floats and removes select fluid from a batch reactor at a prescribed depth below the fluid surface;

U.S. Pat. No. 3,011,510A by Standifird 1959 Sep. 4 describing automatic siphon operation through a pressure activated valve at the intake and a manually operated valve at the outfall of the siphon pipe.

BACKGROUND OF THE INVENTION

1. Field of Invention

The present invention relates to siphons; and controls fluid levels within a batch reactor by a fluid removal procedure with which the siphon flows and remains full of fluid as flow starts and stops in and out of a batch reactor.

2. Description of Related Art

The ability of a batch reactor to mix fluids or separate fluid mixtures and particles is the primary function in most applications. Such Batch reactors have a specific and optimal horizontal location and elevation below the surface of the fluid within which fluid is removed an order to obtain optimal separation or mixture of fluid and particles. Conventional means of siphoning fluid from the desired locations and elevations lack the ability to function once fluid level in the batch reactor is lower than the outfall elevation of the siphon pipe by displacing fluid within the siphon pipe.

Sediment basins, stormwater ponds, sewage treatment lagoons, grease traps, and septic tanks are non-limiting examples of batch reactors but can be anything holding or containing fluid.

Removing fluid from a batch reactor due to some emergency, repair or other necessity for immediate removal is necessary. Traditional batch reactor systems with an emergency fluid removal system in place do so by simply draining the system from a static location at the bottom of the batch reactor or a pump of some type. By draining a batch reactor at the bottom of the system, the fluid removal is be prone to becoming clogged or requiring significant infrastructure changes an order to successfully remove fluid. The ability to remove fluid to minimal levels in a batch reactor is not always readily defined in some batch reactors.

Batch reactors that were previously inadequately designed or failing to remove fluid adequately due to lack of maintenance require improvement, may require an improved system which is cost effective and operates through gravity.

Significant disturbance and work may be necessary to install and/or replace conventional pipes, outfall control systems, and other means of fluid removal from batch reactors. This disturbance should be avoided but is not practical through conventional systems.

Batch reactor systems may utilize permeable filters such as sand an order to filtrate fluid as it passes through the batch reactor and removed at the bottom of the batch reactor utilizing gravity to draw the fluid though and out of the system. Removing fluid at the bottom of the batch reactor can cause problems within the system such as clogging and slow flow rates of fluid and may not be possible in some cases. Filters can also become clogged and polluted at different concentrations throughout the filter, variably reducing fluid flow rates and filtration capabilities. Therefore, it is necessary to create a new route for fluid to flow out of a filter using gravity and increase flow rates, filtration and minimizing energy costs. Almost or completely impermeable layers within filters can slow or stop the flow of fluid through the filter, with which the fluid seemingly isn't absorbed and causes the surface of a filter to be wet and unstable. Filtration systems that may require increased fluid flow rates include, but are not limited to, groundwater removal systems, sanitary sewer treatment systems, potable water systems, and any other filtered system.

There are specific problems with which hazardous particles are released from batch reactors by standard methods of removing fluid, contaminating downstream fluid bodies and/or ecosystems that are well known to those with adequate knowledge in the field of environmental sciences, batch reactor systems and fluid control. Such pollutive fluid, particles and problems which lack control include but are not limited to: fecal matter, nitrogen, phosphorus, bacteria, and many other harmful pollutive fluid, particles and problems related to batch reactor systems and fluid control.

Based on the foregoing, there is a need in the art of a Siphon Float System operating on mechanical, filtration, dilution and hydraulic principals allowing for an automated system to maximize pollutive particle capture within a batch reactor, manage fluid removal, and maximize effective dilution to downstream fluid bodies or systems as an alternative solution to remove fluid from a batch reactor.

SUMMARY OF THE INVENTION

It is an object of this invention to provide a siphon having a valve at the intake, a pressure activated valve at the outfall an order to automatically allow the siphon to start and stop fluid flow as the fluid level within the batch reactor rises and falls below the outfall elevation of the siphon;

It is still another object of this invention to provide a floating intake to the siphon, an order to remove fluid from a batch reactor at a necessary depth below the fluid surface at a static horizontal location within a batch reactor;

It is another object of this invention to provide a method of fluid removal from a filter increasing the rate with which filtration occurs;

It is another object of this invention to provide an outfall structure to the siphon which maintains fluid within the siphon while distributing siphoned fluid to downstream fluid bodies or systems and maximizing dilution and filtration;

These and other objects are accomplished by combining the siphon intake, valves at the intake and outfall, intermediate valves for additional control of the siphon, and outfall structures an order to complete the siphon float system allowing it to work automatically, starting and stopping flow as needed out of the batch reactor as desired.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS AND METHODS

Figure 1:
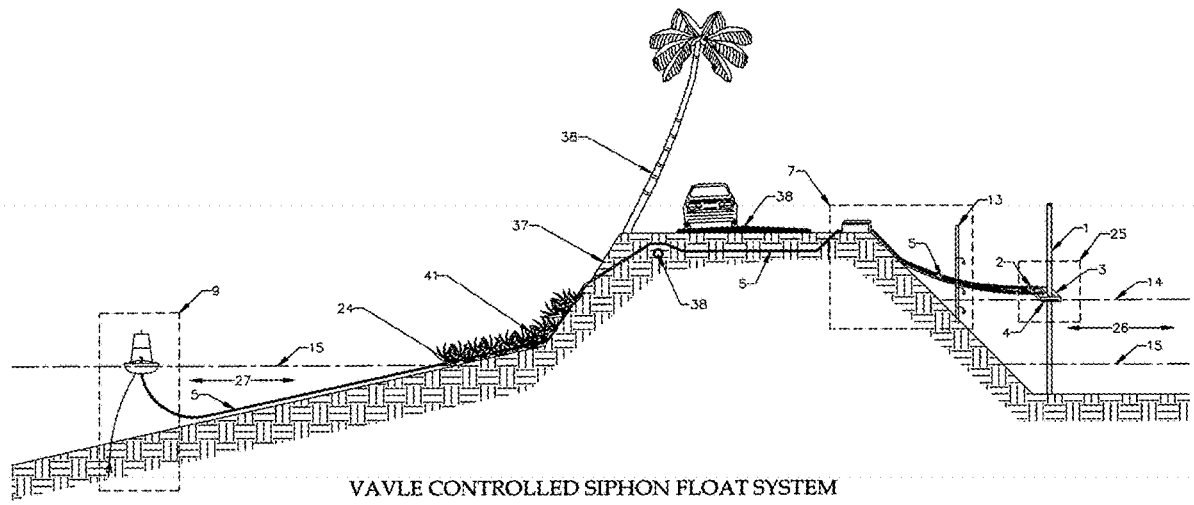
FIG. 1 is a side cross section view of the Siphon Float Intake (25), Valve Control System (7) and Outfall Control Buoy (9) combined as a Siphon Float System utilizing a stormwater pond as a Batch Reactor (26), according to an embodiment of the Siphon Float System.

Preferred embodiments and methods of the present invention and their advantages may be understood by referring to FIGS. 1-8, wherein like reference numerals refer to like elements.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination. The Applicants hereby give notice that new Claims may be formulated to such features and/or combinations of such features during the prosecution of the present Application or of any further Application derived there from.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings.

Referencing FIGS. 1 and 2, a Siphon Float System comprises of the Siphon Intake (4) mounted on a Float (3) with a mechanical or pressure activated Valve (2) wherein, it floats and removes fluid from a Batch Reactor (26) at a constant depth below the Fluid Surface (14) and prevents reverse flow through the Siphon Pipe (5). A Siphon Pipe (5) connects the Siphon Intake (4) to an Outfall Control Structure (6), Outfall Control Buoy (9) and/or additional downstream Batch Reactor (26) wherein fluid is transferred from one to the other.

Figure 2:
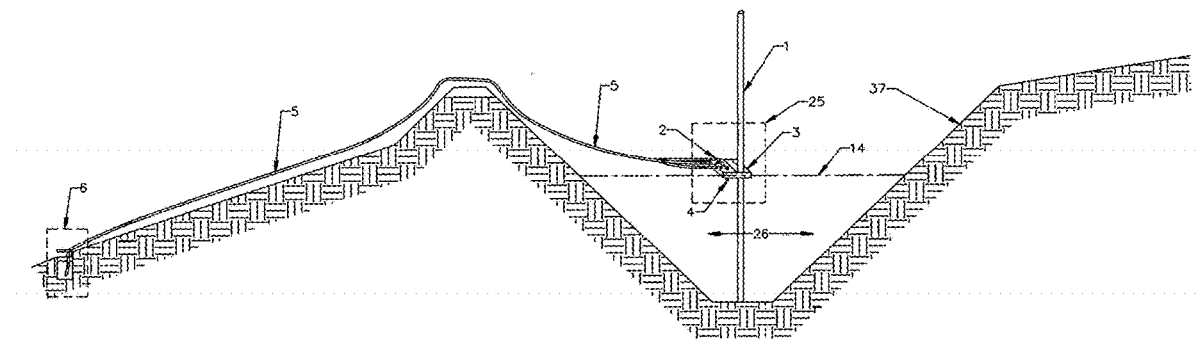
FIG. 2 is a side cross section view of the Siphon Float Intake (25) and Outfall Control Structure (6) combined as a Siphon Float System in its simplest form utilizing a stormwater pond as a Batch Reactor (26), according to an embodiment of the Siphon Float System.

Referencing FIGS. 1 and 2, the Siphon Intake (4) is mounted on a Float (3) in a Batch Reactor (26) slidably connected to a Dowel (1) statically located within a Batch Reactor (26) wherein, the Siphon Intake (4) is horizontally static but can move vertically with the Fluid Level (14). Then, fill the Siphon Pipe (5) with fluid displacing air within the system. Once the Siphon Pipe (5) is filled with fluid, a Valve (2) located on the Siphon Float Intake (25) allows for fluid to flow one direction within the Siphon Pipe (5) to an Outfall Control Structure (6), Outfall Control Buoy (9), and/or downstream Batch Reactor (26). The Siphon Float System maintains a vacuum within the Siphon Pipe (5) preventing fluid displacement inside allowing for automatic operation until fluid fills the upstream Batch Reactor (26) creating hydraulic pressure for flow through the Siphon Pipe (5).

Referencing FIG. 1, the Emergency Fluid Level (15) within a Batch Reactor, is predetermined by the design of the Batch Reactor (26) for the continued operation and not to have harmful effects on the system. This also allows for the unique ability change the Fluid Level (14) within the Batch Reactor (26) for maximum removal of fluid an order to allow for repair, prevent overflow, mitigate flooding and any other reason to remove fluid from Batch Reactor (26) to the greatest extent.

In addition to FIG. 1, the unique ability to place the Siphon Pipe (5) on top of the Exposed Surface (37) or just below the Exposed Surface (37) provides the unique ability to minimize disturbance to Marsh Areas, Wetland Areas (41) or any other sensitive area that unwanted disturbance takes place from Siphon Float System installation. Where conventional gravity piped fluid removal systems must maintain their downward slope, the Siphon Pipe (5) can follow the Exposed Surface (37) elevation and therefore adapt to the necessary elevations as they go up and down at whatever elevation is desired.

Referencing FIGS. 1 and 2, the Dowel (1) is a static part of the Batch Reactor (26) with which defines horizontal position of the Siphon Float Intake (25) allowing it to float and slide vertically up and down the Dowel (1).

Figure 6:
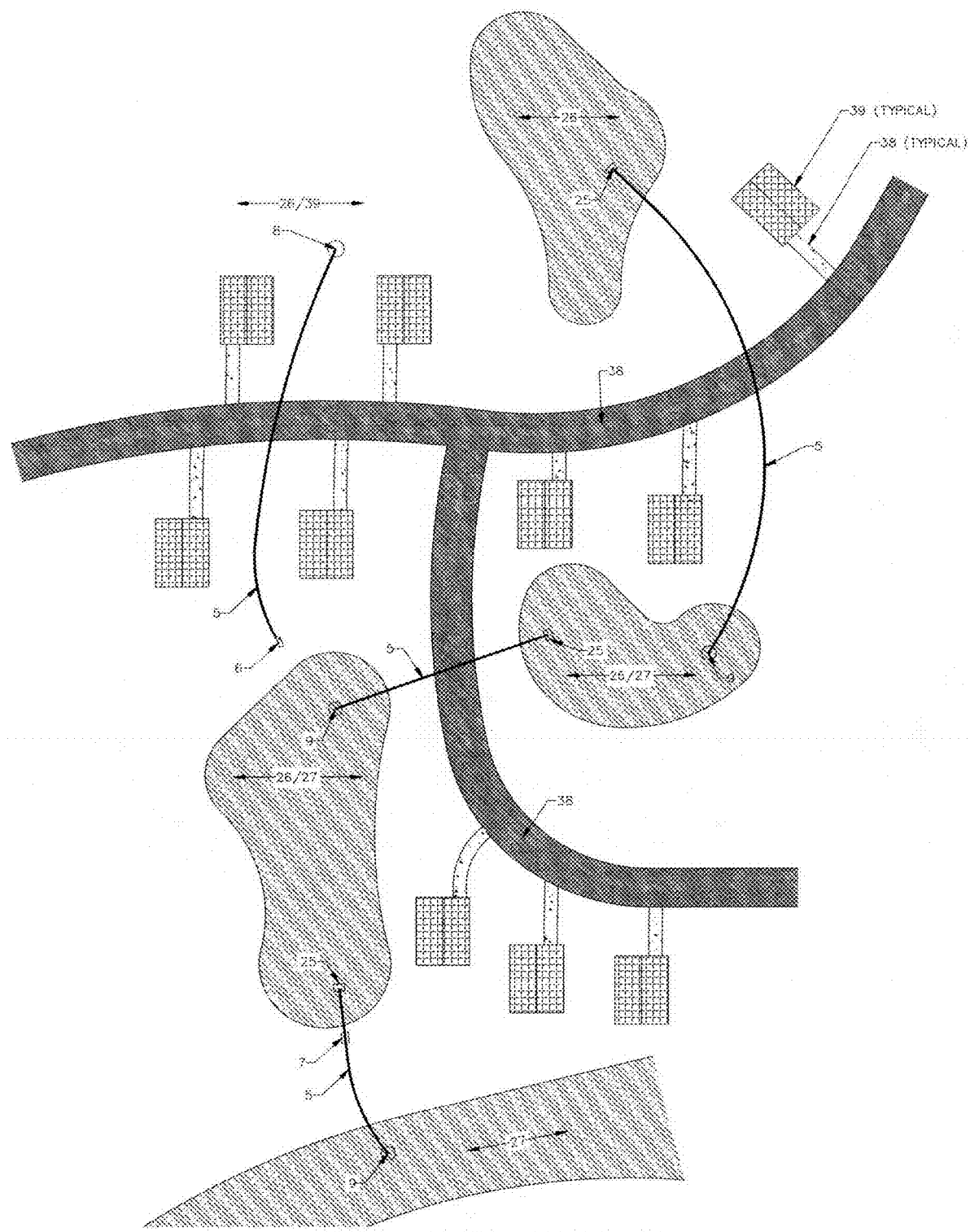
FIG. 6 is a top down plan view of a network of Siphon Float Systems, according to an embodiment of the Siphon Float System.

Referencing FIGS. 1 and 6, the Siphon Pipe (5) is placed from the Batch Reactor (26) to the outfall avoiding Existing Obstructions (38) such as roadways, trees, utilities, and any other obstruction not to be disturbed during installation at appropriate elevations and horizontal locations desired. The Siphon Pipe (5) is also be routed around Existing Structures (39) at any necessary depth or location for avoidance made up of flexible or rigid materials as deemed necessary.

Figure 8:
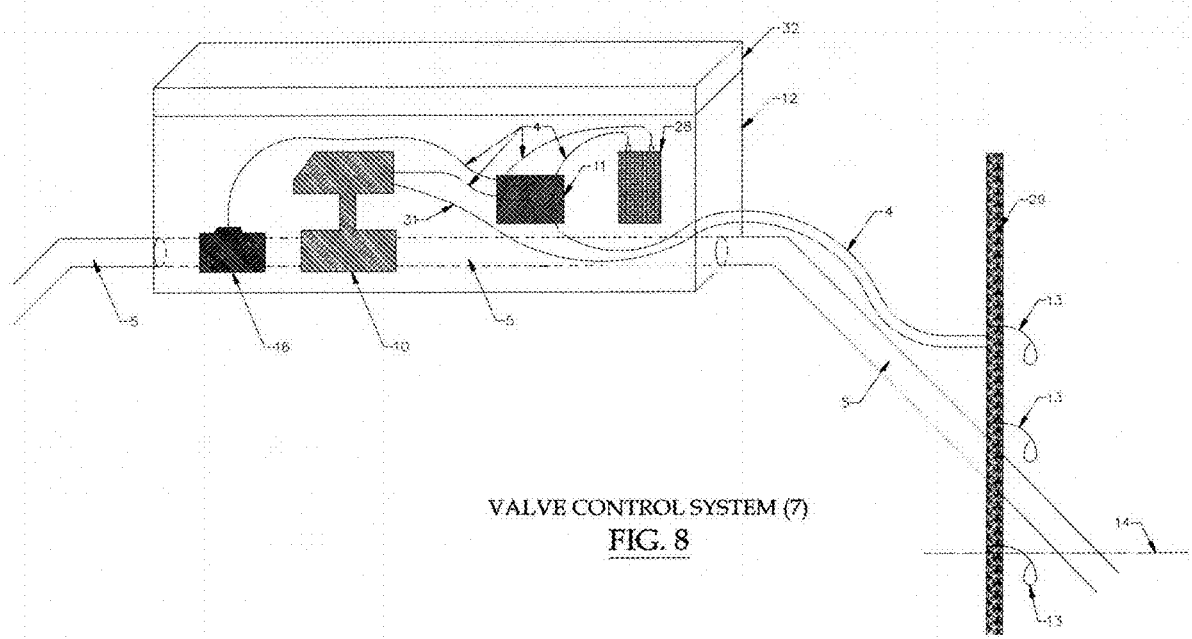
FIG. 8 is an isometric view of the Valve Control System (7), according to an embodiment of the Siphon Float System.

Referencing FIGS. 1, 6 and 8, a Valve (2) keeps the fluid from flowing into the upstream Batch Reactor (26) and a Valve Control System (7) acts to control operations of the siphon whereby the Electronic and Manually Operated Valves (10) are opened and closed in a predetermined order based upon Fluid Levels (14) within the Batch Reactor (26). This allows for the unique ability to control the discharge of fluid within the Siphon Pipe (5) in real time and for automated purposes as necessary for the design.

Referencing FIG. 2, the Siphon Float System is installed temporarily or permanently operating on only pressure an order to remove fluid from a Batch Reactor (26). By doing so, the Valve (2) activation is operated by the downstream Outfall Control Structure (6) elevation, Outfall Control Buoy (9) elevation, or downstream Batch Reactor's (27) Fluid Surface (14) elevation managing fluid levels within the upstream Batch Reactor (26). By doing so, the Siphon Float System controls fluid levels within a Batch Reactor (26) without the use of electricity or outside source of energy, other than the hydraulic pressure that creates flow once the fluid elevation in the Batch Reactor (26) rises above the outfall elevation.

Multiple independent Siphon Pipes (5) may also be installed from a single Batch Reactor (26) to a multitude of outfall systems wherein, if there is a problem or failure of one of the Siphon Pipes (5) there are additional Siphon Pipes (5) functioning to maintain flow to a partial extent until the system is repaired.

Referencing FIG. 2, the Siphon Float System is re-usable as desired by removing it from the bottom of the batch reactor system. Displacement of the Siphon Float System can be achieved by removing structural components, built purposely to be small and light in weight, from the bottom of the Batch Reactor (26) and transplanting said components to a separate or different Batch Reactor (26) of intended use.

Figure 3:
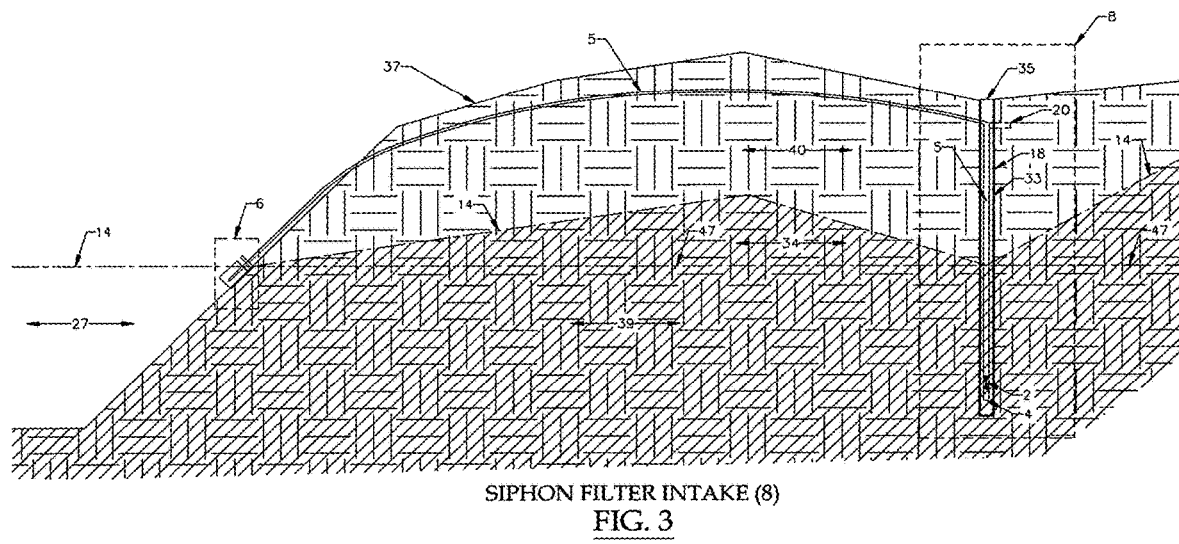
FIG. 3 is a side cross section view of the Siphon Filter Intake (8) and Outfall Control Structure (6) combined as a Siphon Float System utilizing a groundwater within soil as a Batch Reactor (26) and Filter (40), according to an embodiment of the Siphon Float System.

Referencing FIG. 3, the Siphon Filter Intake (8) comprises of a Siphon Intake (4) that includes a Siphon Well (18) and Filtered Porous Sleeve Pipe (33) buried within a Filter (40), a Well Inlet (35), Siphon Intake (4), Valve (2), Siphon Pipe Brace (20), and Siphon Pipe (5) wherein, Filtered Fluid (39) is removed from within a Flooded Filter (34) to an Outfall Control Structure (6) or other means. The Siphon Filter Intake (8) allows for Filtered Fluid (39) to be hydraulically removed by a Siphon Pipe (5) an order to lower Fluid Surface (14) elevation and distribute fluid into a downstream Outfall Control Structure (6). This process is automatic and remains functional if there is Filtered Fluid (39) within the Siphon Well Intake (4) and/or the Siphon Well (18) becomes dry for extended periods as the Valve (2) prevents reverse flow through the Siphon Pipe (5) keeping it full of fluid.

Figure 4:
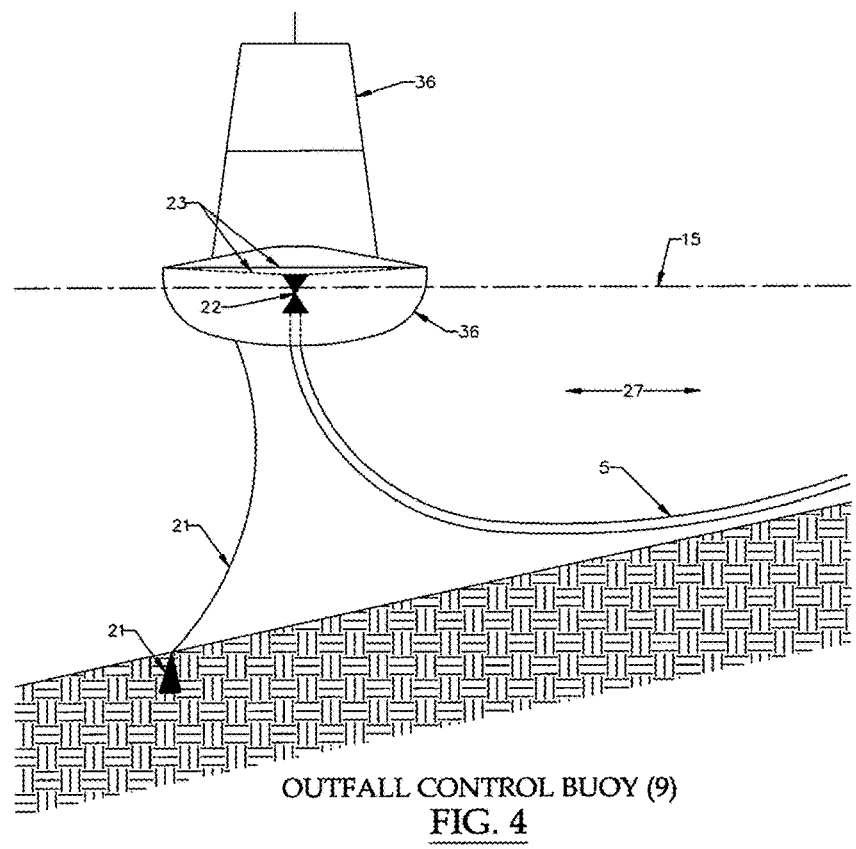
FIG. 4 is a side cross section view of the Outfall Control Buoy (9), according to an embodiment of the Siphon Float System.

Referencing FIGS. 1, 4 and 6, an Outfall Control Buoy (9) comprises of a Floating Buoy (36), Dowel (1) or Anchor (21) providing static horizontal movement and dynamic vertical movement, Pressure Controlled Valve (22) or other type of valve preventing the system from allowing reverse flow into the Siphon Pipe (5) and an Overflow Body (23), wherein fluid overflows into a Downstream Fluid Body (27) and a vacuum of pressure is maintained within the Siphon Pipe (5) so that the Siphon Float System maintains automatic operational capabilities, even if the there is no flow of fluid through the system for extended periods of time. By overflowing out of the Overflow Body (23) above the Downstream Fluid Body (27) at its fluid surface elevation, the system prevents contamination and corrosion of the Siphon Pipe (5). The Outfall Control Buoy (5) is extended away from the Shore (24) of the Downstream Fluid Body (27) as desired order to distribute fluid for maximum dilution of unwanted particles, fluid and pollution within the Downstream Fluid Body (27).

Figure 5:
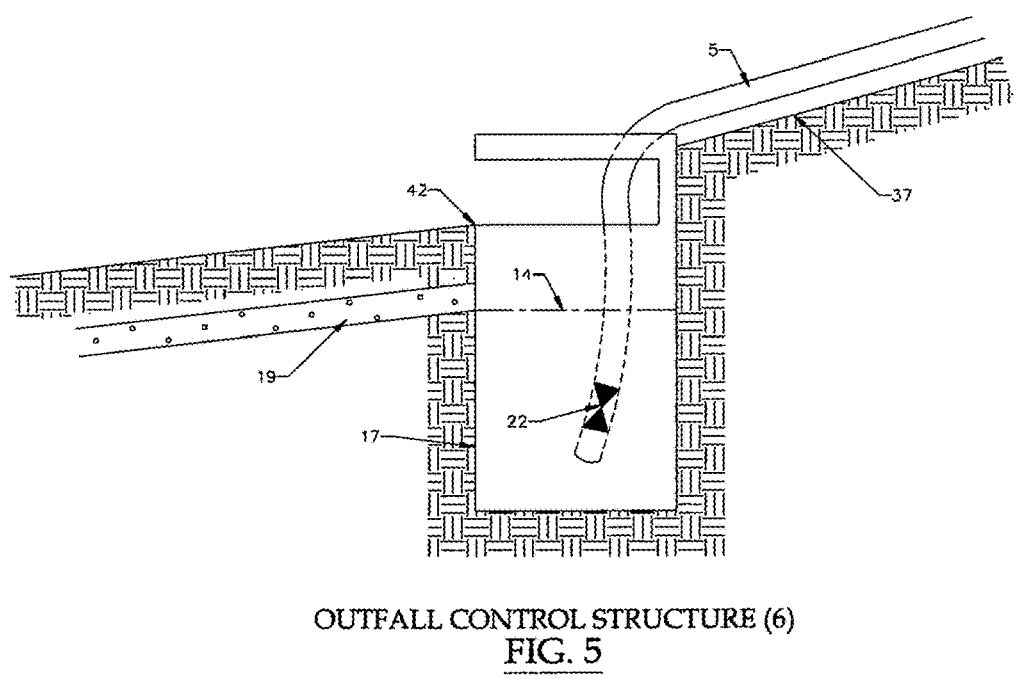
FIG. 5 is a side cross section view of the Outfall Control Structure (6), according to an embodiment of the Siphon Float System.

Referencing FIGS. 2,3 and 5, an Outfall Control Structure (6) comprises of an Impervious Wall (17), Check Valve (22) or other type of valve preventing reverse flow into the Siphon Pipe (5), Filtrated Overflow (19) and an Overflow Spillway (42), wherein fluid overflows through the Filtrated Overflow (19) and Overflow Spillway (42) to a downstream system while keeping the Siphon Pipe (5) submerged in fluid and maintaining a vacuum of pressure so that the Siphon Float System remains automatically operational if there is no flow of fluid through the system for extended periods of time.

Referencing FIG. 6, the Siphon Float System comprises of a network of Siphon Float Systems operating through the necessary Siphon Filter Intakes (8), Valve Control Systems (7), Siphon Float Intakes (25), Outfall Control Buoys (9), Outfall Control Structures (6) and Batch Reactors (26) which Fluid Level (14) elevations are controlled in real time with an emergency management override in place for removing fluid from a network of Siphon Float Systems down to the Emergency Fluid Elevation (15) as deemed necessary to any reason, such as to repair or mitigate flood problems, within a Batch Reactors (26).

Figure 7:
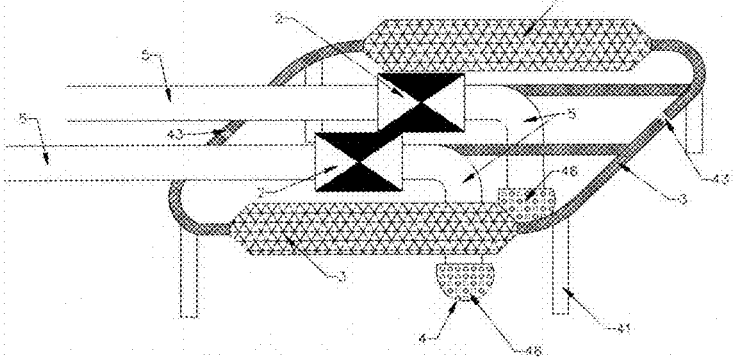
FIG. 7 is an isometric view of the Siphon Float Intake (25), according to an embodiment of the Siphon Float System.

Referencing FIG. 7, the Siphon Float Intake (25) comprises of one or more Legs (41) configured to engage the bottom of the Batch Reactor (26). A Floatation Base (3) is attached to the one or more Legs (41), wherein the one or more Valves (2) is disposed on the Floatation Base (3). A Siphon Pipe (5) extends outward from the Floatation Base (3), wherein the one or more Valves (2) control the flow of fluid within the Siphon Pipe (5) preventing reverse flow and the Siphon Intake (4) is protected by a Vent (46). The Siphon Intake (4) floats at a desired and constant depth below the Fluid Surface (14).

In addition to FIG. 7, mechanical Fittings (43) connect one or more Siphon Pipes (5), Valves (2) and Floats (3) which may separate the Siphon Float Intake (25) apart, allowing for modification such as the installation of additional Siphon Pipes (5), Valves (2), Floats (3) and Vents (46).

Also in addition to FIG. 7, the system may also be modified where the Mechanical Fittings (43) split the Siphon Float Intake (26) in half, and additional Siphon Pipes (5) and Valves (2) may be installed for additional flow and control by the Siphon Float System.

Referencing FIGS. 1 and 8, a Valve Control System (7) comprising of an Electronic and Manually Operated Valve (10), Flow Rate Sensor (16), Battery Back-up or Generator Backup (28) and On-Board Computer (11) contained within a Container (12) and Openable Lid (32) wherein, the Electronic and Manually Operated Valve (10) and On-Board Computer (11) are in communication with a Fluid Elevation Sensor (13) mounted upon a static Sensor Post (29) an order to communicate with the Fluid Level (14) for the Electric and Manually Operated Valve (10) operation. The Valve Control System (7) should be wired appropriately through Communication Wires (30) or other means which allow for operation and communication within the system. A Failsafe Communication Wire (31) or other means is to be in place for direct communication with the Electronic and Manually Operated Valve (10) wherein, removal of fluid takes place if the On-Board Computer (11) fails to operate and the Batch Reactor (26) begins to overflow. Outside sources of power, such as solar or standard power grids should be applied to the Valve Control System (7) for standard operation. Outside sources of networking should also be applied for wired or wireless networking capabilities for control of the Valve Control System (7) from any location. The On-Board Computer (11) may be set to activate the Electronic and Manually Operated Valve (10) via an electronic on or offsite switch that is set to automatically remove fluid once specified Fluid Levels (14) are reached, with which the Electronic Valve (10) open or closed based upon the Fluid Level (14) which is reported by the Fluid Elevation Sensor (13). Flow Rate Sensors (16) may be incorporated into the method allowing the system to slow down or speed up flow rates within the Valve Control System (7) by communication with the On-Board Computer (11) and/or Electronic and Manually Operated Valve (10). The Valve Control System (7) should also contain the method of emergency fluid removal with which the Electronic and Manually Operated Valve (10) is opened, and the Fluid Level (14) is reduced to the greatest extent practical or Emergency Fluid Level (15) as a method to repair or mitigate flooding of the Batch Reactor (26).

The Siphon Float System may comprise a Delay Trigger System in communication with the one or more valves, wherein the Delay Trigger System controls selective delayed operation of the one or more valves, preventing the flow of fluid out of a Batch Reactor (26) for a set amount of time as desired.

Siphon Pipe (5) size and quantity are to be based upon the desired flow rate of the system. The Batch Reactor should be designed so that the Siphon Float System can remove fluid at an adequate rate such that the system never overflows or become flooded. Otherwise, some Batch Reactors (26) will require an emergency spillway or other means at which fluid from the Batch Reactor (26) can overflow into a designated downstream area.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

What is claimed is:

1. A siphon float system comprising:
    a floatation base configured to float on a fluid surface within a batch reactor, the floatation base having a top area, a bottom area, width, depth, thickness, and unit weight providing constant floatation;
    a dowel that is statically connected within the batch reactor and slidably connected to the floatation base to limit horizontal movement of the floatation base but allow vertical movement with the changing fluid level within the batch reactor;
    at least one siphon pipe statically connected to the floatation base, the at least one siphon pipe having a first end and second end, the first end connected to a siphon intake at a constant depth below the floatation base where fluid enters the at least one siphon pipe and the second end connected to at least one outfall control structure where fluid exits the at least one siphon pipe;
    at least one valve disposed on the at least one siphon pipe near or at the siphon intake, the at least one valve is configured to control the flow of fluid within the at least one siphon pipe allowing the flow of fluid in a single direction from the siphon intake to the at least one outfall control structure;
    the at least one outfall control structure is made up of an impervious tank to maintain fluid within the at least one siphon pipe as flow starts and stops due to hydraulic pressure increasing and decreasing within the at least one siphon pipe caused by changing fluid levels within the batch reactor.

2. An outfall control structure comprising:
    a floating buoy placed within a body of fluid, the floating buoy having an anchor with which horizontal movement is prevented and vertical movement is permitted so that the floating buoy remains at the same elevation as the surrounding body of fluid;
    at least one siphon pipe statically connected to the floating buoy at an end of the at least one siphon pipe extending vertically above the surrounding body of fluid;
    an overflow body which rests on the floating buoy at the end of the at least one siphon pipe, above the surrounding body of fluid, with which siphon fluid pools and overflows into the surrounding body of fluid.

3. The outfall control structure of claim 2, wherein siphoned fluid may be siphoned out of the floating buoy onto a body of fluid surface at any desired horizontal location within the body of fluid while constantly maintaining fluid within the at least one siphon pipe as flow starts and stops within the at least one siphon pipe.

4. The siphon float system of claim 1, wherein the at least one valve within the at least one siphon pipe contains a delay trigger system in communication with the at least one valve, wherein opening and closing the at least one valve for flow regulation within the at least one siphon pipe is delayed for a desired time period maintaining fluid within the at least one siphon pipe.

5. A siphon pipe valve control system comprising:
    a valve control system containing a computer system in communication with a network or other outside computer system for control and operation;
    a container to protect and hold the computer and valves operating separate and independent siphon float systems within a network of fluid bodies;
    at least one single valve both electronically and manually operated in connection to at least one siphon pipe and in communication with the computer;
    at least one fluid level sensor communicating the fluid level within a batch reactor to the computer system.

6. The siphon pipe valve control system of claim 5, wherein the at least one valve control system opens and closes the at least one valve connected to the at least one siphon pipe starting and stopping the flow of fluid through the at least one siphon pipe autonomously or automatically based upon fluid levels in the batch reactor and for real time control by the network computer system.

7. The siphon float system of claim 1, wherein multiple siphon pipes, each with its own independent valve and flow, are placed to control flow independently in order to manipulate fluid levels of the batch reactor and allow for continued operation of other siphon pipes if one of the siphon pipes fails to operate.

8. The siphon float system of claim 1, wherein multiple siphon float systems are in place within a multitude of batch reactors for independent manipulation of the fluid level within the batch reactors and bodies of fluid and for mass fluid removal as needed.

9. The siphon float system of claim 1, wherein the at least one valve is a pressure activated valve placed in communication with the at least one siphon pipe to prevent the reverse flow of fluid within the at least one siphon pipe, keeping the at least one siphon pipe full of fluid as flow starts and stops due to varying pressure at the intake source.

* * * * *